United States Patent [19]

Nakagawa et al.

[11] 4,187,118
[45] Feb. 5, 1980

[54] CONCRETE COMPOSITION FOR MAKING CONCRETE MOLDINGS AND METHOD FOR MAKING SUCH CONCRETE MOLDINGS

[75] Inventors: Koji Nakagawa; Yoshiharu Watanabe, both of Oumi, Japan

[73] Assignee: Denki Kagaku Kogyo Kabushiki Kaisha, Tokyo, Japan

[21] Appl. No.: 897,108

[22] Filed: Apr. 17, 1978

Related U.S. Application Data

[63] Continuation-in-part of Ser. No. 824,053, Aug. 12, 1977, abandoned.

[51] Int. Cl.$^2$ ............................................... C04B 7/35
[52] U.S. Cl. ........................................ 106/89; 106/90; 106/97; 106/98
[58] Field of Search ............... 106/89, 109, 315, 90, 106/97, 98

[56] References Cited

U.S. PATENT DOCUMENTS

| | | | |
|---|---|---|---|
| 3,864,138 | 2/1975 | Ochikawa et al. | 106/315 |
| 3,867,163 | 2/1975 | Uchikawa et al. | 106/315 |
| 3,885,979 | 5/1975 | Rio et al. | 106/89 |
| 3,915,724 | 10/1975 | Kokuta et al. | 106/90 |
| 3,954,489 | 5/1976 | Uchikawa et al. | 106/315 |

*Primary Examiner*—James Poer
*Attorney, Agent, or Firm*—Paul J. Sutton

[57] ABSTRACT

A concrete composition for making concrete moldings of high strength is provided which comprises 400–600 kg. of Portland cement per unit m$^3$ of concrete, 3–30% by weight of insoluble (Type II) anhydrous calcium sulfate and 0.1–3% by weight of cement dispersing agent. A method for making concrete moldings of high strength having the above components are also provided which comprises subjecting to pre-steaming and then steam curing under atmospheric pressure. According to the present invention, concrete moldings having both high compressive strength and pre-stress with reduced relaxation can be obtained only in a day without subjecting to autoclave curing.

14 Claims, No Drawings

CONCRETE COMPOSITION FOR MAKING CONCRETE MOLDINGS AND METHOD FOR MAKING SUCH CONCRETE MOLDINGS

CROSS-REFERENCE TO RELATED APPLICATION

This application is a continuation-in-part of application Ser. No. 824,053 filed on Aug. 12, 1977, now abandoned.

BACKGROUND OF THE INVENTION

1. Field of the Invention

This invention relates to a concrete composition for making concrete moldings of high strength and to a method for making such concrete moldings.

2. Prior Art

Hithertofore, concrete moldings such as a concrete pile have been generally made by forming moldings of ordinary Portland cement, elevating the temperature at a rate of 15° C./3 hrs. up to 60°–65° C., then maintaining the moldings within the above temperature range for four hours, curing in water after cooling and subsequently effecting exposure curing. In this method, however, three to four weeks are required before product concrete moldings of predetermined design strength or compressive strength of about 800 kg/cm$^2$ or higher are obtained. In order to obtain such concrete moldings in a relatively short period of time, autoclave curing has to be further effected approximately at 180° C. under 10 atm. after steam-curing. However, this procedure has a disadvantage in that pre-stress transferred during autoclave curing tends to decrease. Particularly, the larger the initial pre-stress, the more remarkably this phenomenon is exhibited. In some cases, more than 50% of the initial pre-stress is killed. This means that desired concrete moldings of high strength cannot be obtained merely by increasing compressive strength. It is, therefore, necessary to transfer a proper order of pre-stress in association with the order of compressive strength. Alternatively, as concrete moldings which have been placed at an elevated temperature of 180° C. are quenched after curing, the water content is abruptly evaporated with resultant sudden shrinkage in the concrete moldings. Therefore, it sometimes occurs that the reduction in weight of the concrete moldings to 5-6% by weight so that the moldings are cracked due to temperature difference between the inner portion and the outer surface thereof. For these reasons, according to the conventional method it has been impossible to make concrete moldings of high strength with reduced relaxation in a short period of time. Alternatively, regulated set cements are known from U.S. Pat. Nos. 3,864,138, 3,867,163 and 3,954,489. This type of cement which contains $11CaO \cdot 7Al_2O_3 \cdot CaX_2$ (X represents halogen) and anhydrous calcium sulfate exhibits high strength in a short period of time. However, since this cement contains $11CaO \cdot 7Al_2O_3 \cdot CaX_2$ having highly active reactivity, concrete having proper workability cannot be obtained when the cement is mixed at a low water/cement ratio. At such a water/cement ratio, high strength cannot be obtained, either. Further, even if the concrete is subjected to steam curing, the strength remains unchanged. It is considered this is because when mixed with water, highly active $11CaO \cdot 7Al_2O_3 \cdot CaX_2$ contained in the regulated set cement causes hydration reaction independently fairly faster than cement (calcium silicate) to thereby form calcium aluminate tri-sulfate hydrate and because the thus formed calcium aluminate tri-sulfate hydrate is converted to calcium aluminate mono-sulfate hydrate ($3CaO \cdot Al_2O_3 \cdot CaSO_4 \cdot 12H_2O$) by steam curing so that fine precise construction of the concrete is broken.

OBJECTS AND SUMMARY OF THE INVENTION

It is an object of the present invention to provide a concrete composition for making concrete moldings of predetermined design strength with reduced relaxation in a short period of time and a method for making such concrete moldings.

It is another object of the present invention to provide a concrete composition for making concrete moldings having both high compressive strength and high pre-stress with reduced relaxation and a method for making such concrete moldings only by the use of the conventional steam curing under atmospheric pressure without subjecting to autoclave curing at high temperature and pressure.

It is a still another object of the present invention to provide a concrete composition for making concrete moldings of high strength which will not crack after curing treatment and a method for making such moldings.

These and other objects will become apparent with reference to the following description.

According to the present invention, a concrete composition for making concrete moldings of high strength is provided. The composition comprises 400–600 kg. of Portland cement per unit m$^3$ of concrete, 3–30% by weight of insoluble (Type II) anhydrous calcium sulfate based on the weight of the Portland cement and 0.1–3% by weight of a cement dispersing agent based on the weight of the Portland cement. The above concrete composition is applied at a water/cement ratio of 25–35% by weight and in fine aggregate percentage of 30–50%. According to the present invention, there is also provided a method for making concrete moldings of high strength which comprises adding, to 400–600 kg. of Portland cement per unit m$^3$ of concrete, 3–30% by weight of insoluble (Type II) anhydrous calcium sulfate based on the weight of said Portland cement and 0.1–3% by weight of cement dispersing agent based on the Portland cement, at a water/cement ratio of 25–35% by weight and in fine aggregate percentage of 30–50%, forming the moldings in the usual manners, subsequently subjecting the moldings thus formed to pre-steaming and thereafter effecting steam curing under atmospheric pressure.

According to the present invention, concrete moldings having compressive strength of more than about 800 kg/cm$^2$ can be produced only in a day without subjecting to autoclave curing.

DESCRIPTION OF THE INVENTION

Cement which may be used according to the present invention includes ordinary Portland cement, high early strength Portland cement, super rapid hardening Portland cement and moderate heat Portland cement as prescribed by ASTM Type 1 through V or JIS R 5210. Of these cements, particularly excellent strength are obtained by the use of high early strength Portland cement and super rapid hardening Portland cement. Some examples of such Portland cement are shown in the following table.

Table

|  | Chemical Composition (%) | | | | | | | | | Mineral Composition | | | | Specific gravity | Specific surface area (cm²/g) |
| --- | --- | --- | --- | --- | --- | --- | --- | --- | --- | --- | --- | --- | --- | --- | --- |
|  | Ig. loss | Insol. | $SiO_2$ | $Al_2O_3$ | $Fe_2O_3$ | CaO | MgO | $SO_3$ | Total | $C_3S$ | $C_2S$ | $C_3A$ | $C_4AF$ |  |  |
| Ordinary Portland cement | 0.6 | 0.1 | 22.2 | 5.1 | 3.2 | 65.1 | 1.4 | 1.6 | 99.3 | 53 | 24 | 8 | 10 | 3.17 | 3220 |
| High early strength Portland cement | 0.9 | 0.2 | 21.0 | 4.9 | 2.8 | 66.2 | 1.1 | 2.5 | 99.6 | 66 | 11 | 8 | 9 | 3.13 | 4340 |
| Super rapid hardening Portland cement | 0.9 | 0.1 | 19.7 | 5.1 | 2.7 | 64.7 | 2.0 | 3.0 | 98.2 | 68 | 5 | 9 | 8 | 3.14 | 5950 |

Note:
$C_3S$ stands for $3CaO \cdot SiO_2$, $C_2S$ for $2CaO \cdot SiO_2$, $C_3A$ for $3CaO \cdot Al_2O_3$ and $C_4AF$ for $4CaO \cdot Al_2O_3 \cdot Fe_2O_3$, respectively.

The amount of Portland cement required for making concrete of 1 m³ is 400–600 kg. Below 400 kg, a water/cement ratio becomes greater than 35% by weight even if the cement dispersing agent is utilized in a greatest amount, thus lowering the strength of the concrete products. On the other hand, above 600 kg. strength of the concrete products will not increase as that much although a water/cement ratio becomes smaller. To make matters worse, cement paste is separated upon centrifugal molding, which brings about difficulties in compaction. Particularly preferable amount of cement to be incorporated is 450–500 kg. per m³ of concrete in case ordinary Portland cement is used. In case of high early strength Portland cement and super rapid heardening Portland cement, 400–470 kg. are most preferred. Where moderate heat Portland cement is used, 500–600 kg. are most preferred.

An amount of the cement dispersing agent in the case where the above mentioned amount of cement is used is so selected that a predetermined water/cement ratio is 25–35% by weight and the slump value is preferably 0–5 cm. When fine aggregate percentage is lower than 30%, the concrete becomes rough so that it is unsuitable for centrifugal molding, whereas above 50% a greater amount of cement dispersing agent is required to obtain workable concrete within the range of water/cement ratio of 25–35% by weight. The range of fine aggregate percentage of 30–50% has been conventionally applied. That is, 38–50% has been utilized in case of pumpcrete, whereas in other cases or when using sands of fine grain size or of small specific gravity or when sands contain shells or the like, fine aggregate percentage of 30–45% has been conventionally applied. The amount of the cement dispersing agent may be in the range of 0.1–3% by weight, preferably 0.5–2% by weight, based on the weight of the Portland cement. Less than 0.1% by weight of the dispersing agent has no substantial effects, while on the contrary, in more than 3% by weight the slump value is subject to wide fluctuations under the influence of a small amount of water no matter how small is the slump value and in addition the concrete readily gets viscous, thus causing difficulties in mixing and centrifugal molding. The cement dispersing agent which may be used according to the present invention includes, for instance lignin sulfonate, polyoxyethylene alkylphenol ether, polyoxyethylene alkyl ether, a salt of condensate of β-naphthalene sulfonic acid with formalin and a dispersant modified with sulfurous or sulfuric acid and containing as a main ingredient amino-S-triazine having at least two $NH_2$ groups. These dispersing agents have functions to disperse cement particles. Among these agents, preferred are a salt of condensate of β-naphthalene sulfonic acid with formalin, for instance a sodium or potassium salt thereof (for instance sold under trade name "MIGHTY" by Kaoh Sekken K.K.) and a dispersant modified with sulfurous acid or sulfuric acid and containing as a main ingredient amino-S-triazine having at least two $NH_2$ groups (for instance sold under trade name "MELMENT" by Showa Denko K.K.).

As set forth hereinabove, a water/cement ratio of 25–35% by weight is an indispensable constitutional element for the present invention when 400–600 kg. of the Portland cement per unit m³ of concrete is incorporated in fine aggregate percentage of 30–50%. Outside of these ranges the present invention is not constituted.

In the meanwhile, for the purpose of normalizing the setting of cement about 1% by weight of gypsum (dihydrate) calculated as $SO_3$ had been conventionally added. Since then, various investigations have been made upon enhancement of initial strength of cement, improvement in chemical resistance, reduction in shrinkage by drying, etc. from the standpoint of mineral composition of cement, as a result of which it has been proposed to add a little more amount of gypsum (dihydrate), i.e. about 2–3% by weight calculated as $SO_3$. Furthermore, it has also been found that if an amount more than that above referred to is incorporated, the setting of cement is excessively delayed or cement is expanded so that negative influences appear in strength.

As described hereinabove, the main characteristic feature of the present invention is that a proper amount of insoluble (Type II) anhydrous calcium sulfate is incorporated and cured in suitable manners for the purpose of obtaining concrete moldings of high strength in the background that the aforementioned concrete blending and the use of gypsum (dihydrate) were publicly known. The invention will be further described in detail.

The reason why insoluble (Type II) anhydrous calcium sulfate is used in accordance with the present invention is that solubility of gypsum (dihydrate) generally used is controlled by specific surface area thereof, hence when the gypsum is pulverized it is dehydrated due to heat of pulverization and readily converted into hemihydrate so that if a large amount of such gypsum is added as in the present invention, false setting is caused and that in case of concrete having small slump value retempering cannot be effected which results in difficulties in handling and in addition thereto the known concrete moldings containing gypsum (dihydrate) have less strength than those containing insoluble (Type II) anhydrous calcium sulfate. Insoluble (Type II) anhydrous calcium sulfate having a specific solubility is excellent in strength among this type of calcium sulfate. That is, after contacting 1 g of insoluble (Type II) anhydrous calcium sulfate with 100 g of a 0.05% by weight Na$_2$HPO$_4$ aqueous solution at 20° C. for a period of one hour while stirring, the reaction mixture is filtered under vacuum and then barium chloride is added to the filtrate to precipitate barium sulfate. The insoluble (Type II) anhydrous calcium sulfate excellent in strength is such that when determining the concentration of SO$_4$ ions in said filtrate, the concentration is 0.03–0.12% by weight, preferably 0.05–0.10% by weight. To obtain such anhydrous calcium sulfate, a method is conveniently utilized in which insoluble (Type II) anhydrous calcium sulfate obtained by subjecting gypsum (dihydrate) to heating treatment at a temperature above 400° C. or insoluble (Type II) anhydrous calcium sulfate having similar physical properties (specific gravity, refractive index, etc.) such as by-product obtained, for example upon producing fluoric acid is controlled in its specific surface area to have approximately 5000–11,000 cm$^2$/g (Blaine value).

The amount of the insoluble (Type II) anhydrous calcium sulfate to be incorporated is 3–30% by weight based on the weight of the Portland cement above mentioned. Where the insoluble anhydrous calcium sulfate is below 3% by weight, slight increase in strength is only observed. On the other hand, where the amount of the insoluble anhydrous calcium sulfate exceeds 30% by weight, setting time is delayed. Accordingly, pre-steaming has to be effected for a long period of time. In view of the fact that strength increases rapidly at an amount of 3% by weight, then a peak strength is given at about 10% by weight and after that the strength gradually decreases, preferable amount to be added is 5–20% by weight, particularly 8–15% by weight.

By the addition of the insoluble (Type II) anhydrous calcium sulfate, setting time is delayed, thus calling for pre-steaming for a long period of time before steam curing is effected. In order to normalize that, it is preferable to use aluminium sulfate together. The amount of aluminium sulfate to be added is 3% by weight or less, preferably 0.15–2% by weight. Above 3% by weight, the concrete will have rapid setting properties. In consequence, the concrete is unstable. The configuration of aluminium sulfate is preferably in the form of Al$_2$(SO$_4$)$_3$·16–17H$_2$O rather than anhydride thereof. The addition of aluminium sulfate scarcely lower the increased strength obtained by the insoluble (Type II) anhydrous calcium sulfate.

For producing concrete moldings having higher compressive strength and higher pre-stress, it is preferred that at least one cement additive as mentioned below be incorporated.

If powders of puzzolanic material is incorporated into the aforementioned Portland cement in an amount of 3% by weight or less, preferably 0.8–2% by weight based on the weight of the cement, it is possible to increase strength after long period of time, particularly strength after ageing for 28 days. The strength varies depending upon the varieties of the puzzolanic material used. As far as silica flour, clay silicate and fly ash are concerned, the order of strength is silica>clay silicate>fly ash.

Alternatively, bending strength can be particularly increased if expansive concrete is used and so blended that the hardened concrete has restricted expansion of 500×10$^{-6}$–3000×10$^{-6}$. To this end, cement expanding agent containing as a main ingredient, for example Free CaO (e.g. trade name "ONODA EXPAN" produced by Onoda Cement K.K.) or cement expanding agent of calcium sulfo-aluminate containing as main ingredients 3 CaO·3Al$_2$O$_3$·CaSO$_4$, Free CaO and Free CaSO$_4$ (e.g. trade name "DENKA CSA" produced by Denki Kagaku Kogyo K.K.) may be used in an amount of 5–25% by weight based on the weight of the Portland cement above described.

Upon calculating fine aggregate percentage, the insoluble (Type II) anhydrous calcium sulfate and the aforementioned cement additives should be deemed as sands.

To the concrete materials above described aggregates and water are added and mixed. Then concrete moldings are formed by the conventional tamped or centrifugal molding. After subjecting the concrete moldings thus formed to pre-steaming, steam curing is effected under atmospheric pressure.

In order to obtain concrete moldings of high strength while reducing the relaxation to the maximum, pre-steaming is preferably effected at least three hours immediately after forming the moldings in advance of steam curing. If steam curing treatment is effected immediately after forming the moldings without pre-steaming, the strength of the moldings is reduced due to heat expansion. The object of the present invention is, therefore, not attainable. Pre-steaming temperature is below 40° C., preferably about 15°–20° C. At lowered room temperature in winter, pre-steaming time should be longer than usual. The atmospheric pressure steam curing may be effected under usual conditions, for instance at 50°–80° C. for 3–4 hours. The effect of the present invention is enhanced if a rate of increasing or decreasing temperatures is maintained as low as possible, preferably below 20° C./hr. At a temperature over 100° C. (steam curing temperature according to the present invention is 40°–100° C.), hydroxyl ellestadite Ca$_{10}$(SiO$_4$)$_3$(SO$_4$)$_3$(OH)$_2$ is formed or relaxation increases during curing, thereby being lowered in strength. On the contrary, below 40° C. increased strength is not obtained. The higher the steam curing temperature is within this temperature range and the longer the period for steam curing is, the higher absolute strength is obtained. It is generally known that in steam curing hydration of cement is excessively promoted so that fine hydrate is formed in the vicinity of cement particles, thereby being increased in initial strength, whereas strength after long period of time is lowered as compared with that in case of standard curing being effected. Nevertheless, according to the present invention, no adverse effect is given by the steam curing. Contrariwise, compressive strength after ageing for 28 days is higher than in case where standard curing (curing in water) is effected.

According to the present invention compressive strength of about 800 kg/cm$^2$ or higher is obtained in a day only by the conventional steam curing under atmospheric pressure. Furthermore, concrete moldings of high strength with no reduction in strength after long period of time are obtained. Incidentally, the present invention is particularly suitable for the production of, for instance piles, poles and concrete pipes made by centrifugal molding.

EXAMPLES OF THE INVENTION

The present invention will be further illustrated by the following examples. % in the examples refer to % by weight.

EXAMPLE 1

Ordinary Portland cement and Type II anhydrous calcium sulfate (Blaine value of 7000 cm$^2$/g) having chemical components shown in Table I and "MIGHTY 150" (produced by Kaoh Sekken K.K.) as a cement dispersing agent were used to form concrete (air content of 1%) having slump value of 3±1 cm shown in Table II. Samples of cyrindrical shape (10φ×20 cm) were made of the concrete. After leaving for 8 hours, the temperature was elevated up to 60°–65° C. at a rate of 15° C./hr. Then, the samples were maintained at the above temperature for 10 hours. After cooling, demold strength after ageing for 24 hours was determined with respect to three samples. The result in average is shown in Table II. As coarse aggregage, crashed stones having maximum size of 25 mm and fineness modulus of 6.54 were used and as fine aggregate natural sands of fineness modulus of 2.75 (from Himekawa, Niigate Pref.) were used.

In table III, the result obtained by determining final setting time of cement paste when various amounts of Type II anhydrous calcium sulfate were added (based on the weight of cement) is shown.

Next, to normalize setting of cement Al$_2$(SO$_4$)$_3$·16–17 H$_2$O (First grade reagent) was further added on the basis of the weight of cement to cement paste to which 10% of Type II anhydrous calcium sulfate had been added. The result is shown in Table IV.

Table III

| Amount added of type II anhydrous calcium sulfate (%) | 0 | 3 | 5 | 8 | 10 | 15 | 20 | 30 |
|---|---|---|---|---|---|---|---|---|
| Final setting time (hr.) | 4.0 | 4.5 | 5.0 | 6.0 | 7.5 | 8.5 | 9.4 | 12.5 |

Table II

| Run No. | Ordinary Portland cement | Type II anhydrous calcium sulfate | Water | Fine aggregate | Coarse aggregate | Aluminium sulfate | "MIGHTY 150" | Fine aggregate percentage (%) | Compressive strength (kg/cm$^2$) |
|---|---|---|---|---|---|---|---|---|---|
| 1 | 470 | 0 | 141 | 791 | 1049 | 0 | 4.7 | 43.0 | 563 |
| 2 | " | 14.1 | " | 776.9 | " | 0 | " | 42.6 | 771 |
| 3 | " | 23.5 | " | 767.5 | " | 0 | " | 42.2 | 852 |
| 4 | " | 37.6 | " | 753.4 | " | 0 | " | 41.8 | 930 |
| 5 | " | 47 | " | 744 | " | 0 | " | 41.5 | 956 |
| 6 | " | 70.5 | " | 720.5 | " | 0 | " | 40.7 | 909 |
| 7 | " | 94 | " | 697 | " | 0 | " | 39.9 | 859 |
| 8 | " | 141 | " | 650 | " | 0 | " | 38.3 | 808 |
| 9 | " | 47 | " | 744 | " | 0.705 | " | 41.5 | 948 |
| 10 | " | " | " | " | " | 1.175 | " | " | 965 |
| 11 | " | " | " | " | " | 4.7 | " | " | 952 |
| 12 | " | " | " | " | " | 9.4 | " | " | 969 |
| 13 | " | " | " | " | " | 14.1 | " | " | 923 |

*(Unit amount (kg/m$^3$))*

Table IV

| Amount of aluminium (%) sulfate added | 0 | 0.15 | 0.25 | 1.0 | 2.0 | 3.0 |
|---|---|---|---|---|---|---|
| Final setting time (hr.) | 7.5 | 6.0 | 4.5 | 3.0 | 2.5 | 0.5 |

EXAMPLE 2

Instead of ordinary Portland cement high early strength Portland cement was used. In the similar manners, compressive strength was determined. The concrete composition and the result are shown in Table V.

Table I

| Material | Ig-loss | Insol | SiO$_2$ | Al$_2$O$_3$ | Fe$_2$O$_3$ | CaO | MgO | SO$_3$ | Total | Free-CaO |
|---|---|---|---|---|---|---|---|---|---|---|
| Ordinary Portland cement | 0.4 | 0.1 | 22.1 | 4.9 | 3.1 | 64.4 | 1.5 | 1.7 | 98.2 | 0.2 |
| Type II anhydrous calcium sulfate | 0.1 | 0.3 | 0.2 | 0.7 | 0.3 | 40.7 | — | 56.0 | 98.3 | — |

*(Component (%))*

Table V

| Run No. | High early strength Portland cement | Type II anhydrous calcium sulfate | Water | Fine aggregate | Coarse aggregate | "MIGHTY 150" | Fine aggregate percentage (%) | Compressive strength (kg/cm$^2$) |
|---|---|---|---|---|---|---|---|---|
| 14 | 440 | 0 | 141 | 748 | 1131 | 6.6 | 40 | 681 |
| 15 | 440 | 44 | 141 | 704 | 1131 | 6.6 | 40 | 996 |

*(Unit amount (kg/m$^3$))*

EXAMPLE 3

Ordinary Portland cement and Type II anhydrous calcium sulfate shown in Table I were used. The solubility was changed by varying the specific surface area. The experiments were made in respect to various amounts of Type II anhydrous calcium sulfate. The same blending conditions as in Example I were utilized.

Concrete samples of cyrindrical shape (10φ33 20 cm.) were left as they were for four hours, thereafter the temperature was raised at 75° C./3 hrs. and maintained for four hours at 75° C. Then steam was stopped and cooled. After 24 hours demold strength was determined. The result is shown in Table VI. As for some samples, curing was further effected in water at 20° C. after demolding. After ageing for 14 days compressive strength was determined. The result is given in parentheses.

Table VI

| Run No. | Amount added (%) | Solubility (%) | | | | | | |
|---|---|---|---|---|---|---|---|---|
| | | 0.020 | 0.032 | 0.054 | 0.073 | 0.099 | 0.124 | 0.140 |
| | | Specific Surface area (cm²/g) | | | | | | |
| | | 1560 | 3200 | 5400 | 7700 | 11000 | Impossible to determine | Impossible to determine |
| 16 | 7 | 627 | 688 | 725 (1005) | 770 | 775 | 738 | 655 |
| 17 | 10 | 638 | 703 | 758 (1020) | 830 (1031) | 847 (1087) | 781 | 660 |
| 18 | 15 | 654 | 742 | 781 | 808 | 808 (972) | 770 | 670 |

For comparison, compressive strength was determined in similar manners in different curing conditions in respect of concrete into which Type II anhydrous calcium sulfate having solubility of 0.073% in Run No. 17 had be incorporated. It was determined that the compressive strength was 374(801) kg/cm² in case of standard curing and 285(190) kg/cm² in case of autoclave curing at 180° C.

EXAMPLE 4

To the concrete blended according to Run No. 5 in Example 1 20% of cement expanding agent of calcium sulfoaluminate (Trade name "DENKA CSA" produced by Denki Kagaku Kogyo K.K.) based on the weight of the Portland cement was added in place of sands. The restricted expansion of this concrete was 1100×10⁻⁶. The concrete was put into dies (10×10×30 cm.) having a steel ratio of 1.7%. After leaving for four hours the temperature was elevated to 60° C. in three hours. Then the moldings were subjected to steam curing for four hours and subsequently cooled for 24 hours. After demolding, the moldings were cured for 7 days in water at 20° C. and further left as they were at 20° C. indoors at RH 70% until for 28 days.

This sample had chemical pre-stress of 39.3 kg/cm² restricted bending strength of 222.0 kg/cm² and compressive strength of 921 kg/cm².

EXAMPLE 5

To the concrete blended according to Run No. 4 in Example 1 silica flour having average grain diameter of about 0.3μ was added in place of sands in an amount of 1.8% based on the weight of the Portland cement. The similar steam curing as in Example 1 was effected. The demold strength was 990 kg/cm². The strength obtained by ageing for 28 days in atmosphere after demolding was 1120 kg/cm².

EXAMPLE 6

In the usual way pre-stressed concrete piles were made of concrete having the same composition as in Run No. 5 of Example 1 by centrifugal compaction molding. The concrete piles thus formed were subjected to pre-steaming for four hours at room temperature, i.e. 20° C. The temperature was raised up to 65° C. in about three hours and maintained for 3.5 hours. Then after steam was stopped, the piles were cooled and left in atmosphere.

Pre-stress was transferred in the usual way. As pre-stressed steel materials, steel bars each having a diameter of 9 mm and 3 mm prescribed by JIS G 3112 SR 24 and JIS G 3101 SS 41 and steel wires each having a diameter of 3.2 mm prescribed by JIS G 3532 SWM-B were used.

The pre-stressed concrete pile thus obtained after ageing for one day was subjected to experiments. According to the loading method as prescribed by JIS A 5335(7), cracking and breaking moment was determined on the main body of the pile. The result is given in Table VII.

Table VII

| Sampling pile | | | cracking moment (kg . m) | | breaking moment (kg . m) | |
|---|---|---|---|---|---|---|
| Type | Outer diameter (mm) | length (m) | According to the invention | Prescribed value | According to the invention | Prescribed value |
| A | 350 | 10 | 4750 | 3500 | 6750 | 5250 |
| B | 400 | 10 | 9490 | 7500 | 16990 | 13500 |

After ageing for 32 hours reduced percentage in weight of the pre-stressed concrete pile made in accordance with the present invention was determined. The result was 0.02%.

In the meanwhile, according to the conventional autoclave curing reduced weight elapsed for 1-2 hours after curing amounted to 5%. From this fact it is understood that evaporation of water content and shrinkage necessarily accompanied therewith are almost avoided according to the present invention whereby it is possible to make concrete moldings with reduced relaxation and having creep almost equal to that made by means of autoclave curing.

EXAMPLE 7

100 parts of commercially availably regulated set cement (Trade name "Jet Cement", Onoda Cement Co., Ltd.) containing $11CaO \cdot 7Al_2O_3 \cdot CaF_2$, 170 parts of sands and 36 parts of water were mixed. The mixture was molded to form a cylindrical sample of $5 \phi \times 10$ cm. The sample was subjected to pre-steaming for 4 hours and then to steam curing at 65° C. for 7 hours and left as it was. The compressive strength after ageing for 24 hours was 640 kg/cm².

Alternatively, when the cement according to the invention in which 10% by weight of insoluble (Type II) anhydrous calcium sulfate was incorporated into ordinary Portland cement was used instead of the regulated set cement, the compressive strength was 925 kg/cm².

Incidentally, the chemical compositions of the regulated set cement were as follows:

| | | Chemical Composition (%) | | | | | | |
|---|---|---|---|---|---|---|---|---|
| Ig. loss | Insol. | $SiO_2$ | $Al_2O_3$ | $Fe_2O_3$ | CaO | $SO_3$ | MgO | F |
| 0.9 | 0.1 | 13.7 | 10.7 | 1.8 | 58.7 | 11.0 | 0.7 | 0.9 |

While the present invention has been described with reference to the specific examples, it should be understood that the invention is not restricted to such examples, but any change and modification may be made within the spirit and scope of the present invention as recited in the appended claims.

What is claimed is:

1. A method for making concrete moldings of high strength which comprises adding, to 400–600 kg. of Portland cement per unit m³ of concrete, 3–30% by weight of insoluble (Type II) anhydrous calcium sulfate based on the weight of said Portland cement and 0.1–3% by weight of cement dispersing agent based on the weight of the Portland cement, at a water/cement ratio of 25–35% by weight and in fine aggregate percentage of 30–50%, forming the moldings in the usual manners, subsequently subjecting the moldings thus formed to pre-steaming and thereafter effecting steam curing under atmospheric pressure.

2. The method as claimed in claim 1 wherein said insoluble (Type II) anhydrous calcium sulfate is such that when contacting 1 g of insoluble (Type II) anhydrous calcium sulfate with 100 g of a 0.05% by weight $Na_2HPO_4$ aqueous solution at 20° C. for a period of one hour while stirring, the concentration of $SO_4$ ions in said solution is 0.03–0.12% by weight.

3. The method as claimed in claim 1 wherein the amount of insoluble (Type II) anhydrous calcium sulfate to be added is 8–15% by weight based on the weight of the Portland cement.

4. The method as claimed in claim 1 wherein said cement dispersing agent is a salt of condensate of $\beta$-naphthalene sulfonic acid with formalin and/or a dispersant modified wth sulfurous acid or sulfuric acid and containing as a main ingredient amino-S-triazine having at least two $NH_2$ groups and wherein 0.5–2% by weight of said dispersing agent is incorporated based on the weight of the Portland cement.

5. The method as claimed in claim 1 wherein 3% by weight or less of $Al_2(SO_4)_3 \cdot 16-17 H_2O$ is further incorporated based on the weight of the Portland cement.

6. The method as claimed in claim 1 wherein 3% by weight or less of powders of puzzolanic material selected from the group consisting of silica flour, clay silicate and fly ash is further incorporated based on the weight of the Portland cement.

7. The method as claimed in claim 1 wherein a cement expanding agent is further incorporated so that the hardened concrete has restricted of $500 \times 10^{-6} - 3000 \times 10^{-6}$.

8. The method as claimed in claim 1 wherein said pre-steaming is effected for a period of at least three hours after said moldings are formed in the usual manners.

9. The method as claimed in claim 1 wherein said steam curing is effected at a temperature of 50°–80° C.

10. The method as claimed in claim 1 wherein said concrete moldings are pre-stressed concrete piles or pre-stressed concrete poles.

11. The method as claimed in claim 1 wherein the steam curing is carried out at a temperature of less than 100° C.

12. The method as claimed in claim 1 wherein the pre-steaming is carried out at a temperature of less than 40° C. for a period of at least three hours.

13. The method as claimed in claim 12 wherein the temperature after pre-steaming is completed is increased at a rate of less than 20° C. per hour.

14. The method as claimed in claim 1, wherein the Portland cement is substantially free from $11 CaO \cdot 7Al_2O_3CaX_2$ wherein X represents a halogen atom.

* * * * *